W. J. MACK.
CHERRY PITTER.
APPLICATION FILED SEPT. 11, 1907.
911,828.
Patented Feb. 9, 1909.
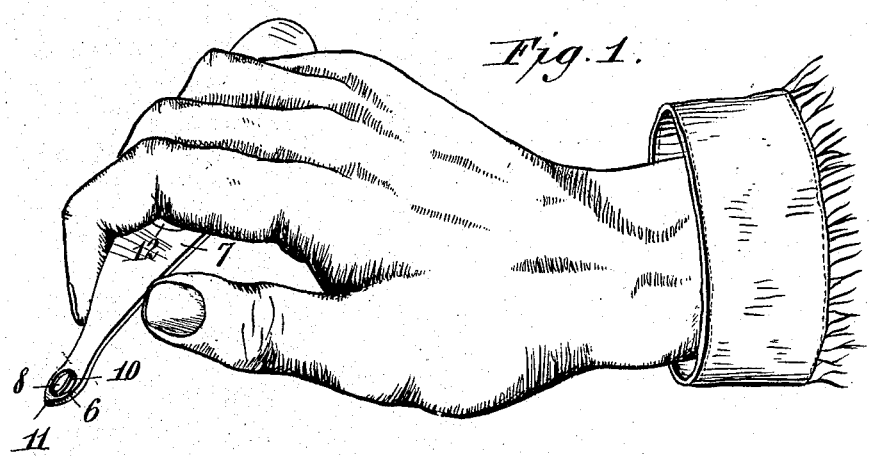
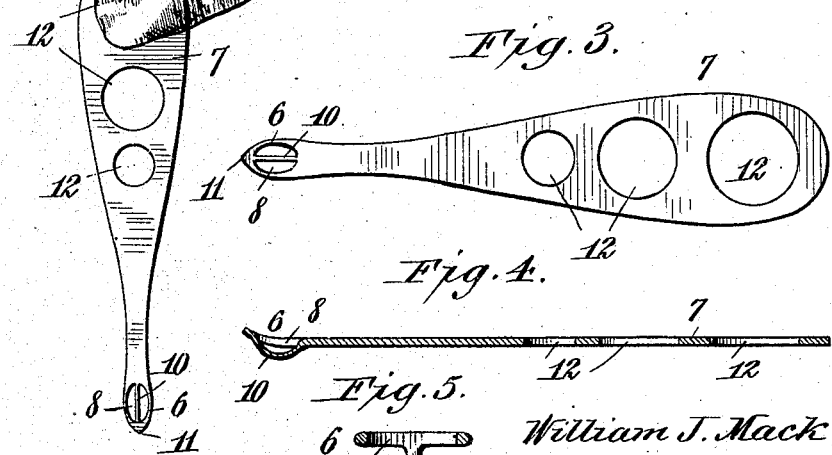
Witnesses:
Harry D. Rapp.
Christ Feinle.
William J. Mack,
Inventor.
By Emil Neuhart
Attorney.

UNITED STATES PATENT OFFICE.

WILLIAM J. MACK, OF BUFFALO, NEW YORK, ASSIGNOR OF ONE-HALF TO CARRIE D. DILLEMUTH, OF BUFFALO, NEW YORK.

CHERRY-PITTER.

No. 911,828.   Specification of Letters Patent.   Patented Feb. 9, 1909.

Application filed September 11, 1907. Serial No. 392,344.

*To all whom it may concern:*

Be it known that I, WILLIAM J. MACK, a citizen of the United States, residing at Buffalo, in the county of Erie and State of New York, have invented certain new and useful Improvements in Cherry-Pitters, of which the following is a specification.

My invention relates to improvements in cherry-pitters and has for its object to provide a pitting-tool of simple and cheap construction, whereby the pits of cherries can be quickly and easily removed without unnecessarily destroying the meat of the fruit.

A further object is, the production of a device of this kind so constructed that it can be easily handled, and while held on the hand can be swung into different positions so that the user can stem cherries without inconvenience and without removing the tool from the hand.

With the above and other objects in view, as will more fully appear hereinafter, the invention consists in certain features of construction and arrangement of parts to be hereinafter described and more particularly pointed out in the subjoined claims.

In the drawings forming part of this specification,—Figure 1 is a view illustrating the manner of using my improved tool for pitting cherries. Fig. 2 is a view showing the tool swung into a position of disuse so that the user will be free to use the hand for other purposes. Fig. 3 is a plan view of the device. Fig. 4 is a central longitudinal section of the same. Fig. 5 is an enlarged cross section through the pitting-eye.

Similar numerals of reference refer to similar parts throughout the several figures in the drawings.

The tool is formed of a piece of metal shaped to provide a narrow pitting portion 6, and a wide handle 7 gradually diminished in width toward said pitting portion. The pitting portion is formed by stamping an opening 8 in the narrow end of the tool and bulging a narrow strip of metal downward to form a bowed pit-retainer 10. The pitting portion is preferably pointed, as at 11, so that it can be quickly inserted into a cherry and forced underneath the pit thereof, after which a slight upward pull will remove the pit from the cherry without drawing out any portion of the meat. The pit-retainer acts to prevent a pit smaller than the eye from passing through the latter. The metal at the sides and front of the eye is quite thin so as to cut freely through the meat when withdrawing the pit.

The handle 7 has a plurality of openings 12 of different sizes, through one of which the smallest finger of the hand is adapted to enter; the thumb and remaining fingers of the hand grasping the handle between the opening through which the finger is passed and the pitting-portion of the tool, as clearly shown in Fig. 1.

By providing a plurality of openings the tool can be easily manipulated by children as well as adults; the location and size of the openings being such that the tool will easily fit hands of different sizes.

When the user of this tool desires to stem cherries or attend to other work, it will not be necessary to remove the tool from the hand to be taken up again when pitting, as it is merely necessary to release the thumb and fingers grasping the handle and allow the tool to swing on the smallest finger of the hand, as shown in Fig. 2, when the thumb and remaining fingers are free for use otherwise. This is a very important feature of my invention, since it guards against mislaying the tool, and is particularly desirable when stemming cherries between times of pitting.

Having thus described my invention, what I claim is,—

1. A cherry-pitter formed of a piece of flat metal having an eye at one end and a pit-retainer connecting opposite sides of said eye.

2. A cherry-pitter having an eye at one end and a bowed pit-retainer arranged lengthwise of said eye, substantially as set forth.

3. A cherry-pitter formed of a flat piece of metal pointed at one end and having an eye at said pointed end and a bowed pit-retainer arranged centrally of said eye.

4. A cherry-pitter formed of a flat piece of metal having a handle-portion and a pitting-portion, said handle-portion having an opening and said pitting-portion having an eye and a curved pit-retainer arranged centrally of said eye.

5. A cherry-pitter formed of a single piece of metal and comprising a wide and flat handle having a series of finger-openings and a narrow pitting portion having a pointed end and an eye, said handle being tapered toward said pitting portion.

In testimony whereof, I have affixed my signature in the presence of two subscribing witnesses.

WILLIAM J. MACK.

Witnesses:
ELLA C. PLUECKHAHN,
MAY F. SEWERT.